No. 762,425. PATENTED JUNE 14, 1904.
J. R. LORD.
ELECTRICAL BATTERY.
APPLICATION FILED JUNE 5, 1903.
NO MODEL.
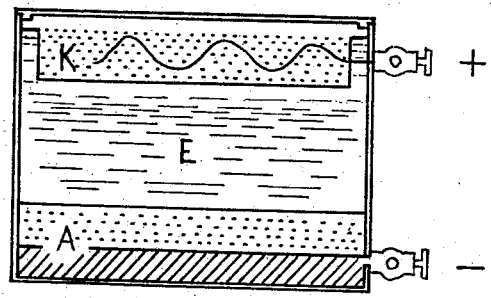
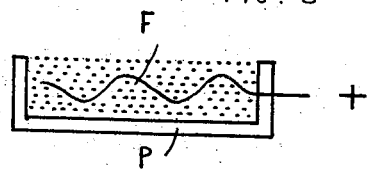
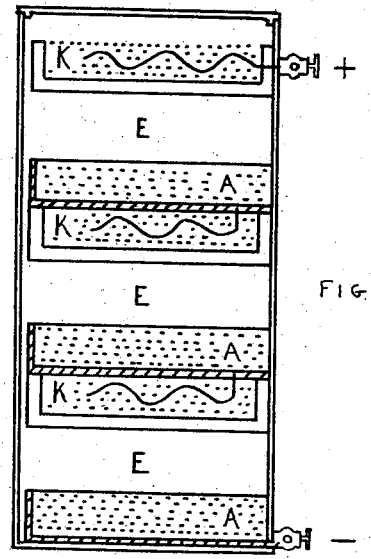
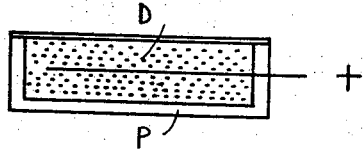
WITNESSES: INVENTOR:
John Ross J. Roger Lord.

No. 762,425. Patented June 14, 1904.

UNITED STATES PATENT OFFICE.

JOHN ROGER LORD, OF SAN FRANCISCO, CALIFORNIA.

ELECTRICAL BATTERY.

SPECIFICATION forming part of Letters Patent No. 762,425, dated June 14, 1904.

Application filed June 5, 1903. Serial No. 160,179. (No model.)

*To all whom it may concern:*

Be it known that I, JOHN ROGER LORD, a citizen of the United States, residing at San Francisco, California, have invented a new and useful Electrical Battery, of which the following is a specification.

My invention comprises a class of batteries the distinctive principle of which may be briefly stated thus: In any galvanic cell, whether employed as primary or secondary, the anode is chemically attacked by the electrolyte and is hence diminished in quantity, the active material of the anode combining with any or all of the other elements of the battery, and when these reactions have proceeded to a conclusion the cell is said to be exhausted. In this invention the anode active material is a compound of an anode metal.

The term "anode metal" is intended to mean any metal which may be employed as an anode, (that electrode from which the current or positive ion proceeds through the electrolyte in an electrically-active battery.)

The chemical combination and mechanical arrangement in this battery are such that a compound of an anode metal is chemically precipitated upon the anode from the used electrolyte, thereby re-forming anode active material. The battery is hence regeneratory to this extent, yet while anode active material is automatically re-formed in the cell other considerations, as will appear, cause the battery to gradually deteriorate in the course of time and to ultimately require a process of rehabilitation.

Figure 1 in the drawings illustrates a form of galvanic cell, A being anode, E electrolyte, and K cathode. Fig. 2 illustrates a form of anode; Figs. 3 and 4, different forms of cathode with and without solid depolarizers. Fig. 5 represents a series of cells similar to Fig. 1, or one cell divided into sections.

Practically any known chemical combination for the chemical generation of an electrical current may with suitable mechanical arrangement be made to automatically transform itself into the sort of regeneratory element described.

Beginning with the simplest illustration—

| anode | electrolyte | cathode |
|-------|-------------|---------|
| 2Zn   | $H_2SO_4 + H_2O$ | C | reacts into

| Zn | $ZnSO_4 + H_2O$ | C ($H_2$ which escapes.) |

If the element is originally arranged as last shown, there is a current when circuit is closed, which, however, becomes rapidly polarized. If now the cathode be increased in surface, the element remaining otherwise the same the current is improved. The cathode surface may be increased by the employment of a finely-divided cathode metal.

The term "cathode metal" is intended to embrace any electrical conducting substance which may be employed as a cathode—in other words, any substance the positive element of which is not chemically attacked by the electrolyte. The division may be mechanical or by precipitation. Construction is illustrated in Fig. 3, + being the positive pole, F finely-divided conductor, and P a porous envelop holding F in position if F is of such character as to require to be held.

In the element last above indicated if instead of using Zn as an anode an oxid of an anode metal is employed as anode active material the current is still further improved, the oxygen in the compound having a depolarizing effect similar to that of a depolarizing agent diffused through the electrolyte or fixed at the cathode. The construction of an anode of this character is illustrated in Fig. 2, where — is the negative pole-piece connected to an extension of metal or other conducting material, upon which an oxid of an anode metal O is either placed initially or precipitated by a subsequent chemical reaction in the electrolyte. It may be heated or baked or mixed with another compound to harden it and to thus improve the electrical connection. The conductor should preferably consist of a metal similar to that composing the oxid and should be placed in a horizontal position at the bottom of the electrolyte or at the bottom of any given section of the electrolyte in order that the anode compound subsequently precipitated from the used electrolyte may fall upon or in proximity to such conductor, thereby reforming active material of the anode. While good electrical results are had from this arrangement, it is found that the current is still further improved by providing an additional depolarizer at the cathode—such as CuO, $PbO_2$, $H_2CrO_4$, &c.—the chemical action of which is rendered apparently catalytic on account of the presence of a negative (or depolarizing) element in the active material of the anode. A depolarizing compound which is insoluble in the electrolyte employed is preferable, though the diffusion of $H_2CrO_4$ or a similar solution through the electrolyte is not specially objectionable.

The theory which follows is believed to explain the operation of my battery and is based upon observed results. Arranged as above indicated the element is illustrated by

| anode | electrolyte | cathode |
|---|---|---|
| Zn / ZnO | $ZnSO_4 + H_2O$ | $PbO_2$ / Cu |

If the cathode is merely finely-divided copper and ZnO is also omitted, it is observed that $H_2$ evolves from the element if circuit stands closed for a time. The only hydrogen in the element is in $H_2O$. Hence $H_2O$ is evidently decomposed.

When $ZnSO_4$ (or any other salt) is put into solution, there is a chemical reaction with water, as is evidenced by the thermal change. The rearrangement of molecules in the solution must be such that Zn can displace hydrogen, since Zn does so. It is probably

Zn from the anode may then displace $H_2$, forming a structure thus:

and releasing $H_2$, which accumulates at cathode.

When ZnO is employed as anode active material, it is the Zn from ZnO which displaces $H_2$ in the graphic structure, leaving the O from ZnO available to reoxidize the released $H_2$, and thus obviating the necessity for $H_2$ to draw on some other depolarizing agent.

The action of the additional depolarizer is apparently catalytic. In support of this view are these facts: that the presence of such additional depolarizer very materially improves the character of the current, particularly with respect to the length of time it continues to be manifested, (a matter of weeks,) with but slow deterioration in value on continually-closed circuit, and that after continued use of the battery such additional depolarizer is found not to have been reduced chemically. Its action may be and probably is this:

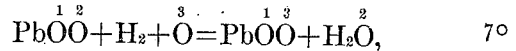

in which $PbO_2$ (PbOO) is taken to be a depolarizing compound located at the cathode, $H_2$ taken to represent the hydrogen displaced from the electrolyte by Zn, (of ZnO,) and the O to represent the oxygen simultaneously released from ZnO. The whole is equivalent to $PbO_2 + H_2O$ regardless of which particular atom of oxygen combines with $H_2$. No oxygen escapes from the cell, and the $PbO_2$ (or any equivalent depolarizer) is not reduced, whereas in the absence of ZnO (or equivalent compound) as anode active material the $PbO_2$ (or equivalent depolarizer) is reduced. Observe now that when Zn displaces $H_2$ from the electrolyte the structure

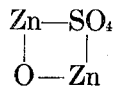

is left suspended in water and that it, together with the unused zinc sulfate dissolved in water, constitute the electrolyte. It is immaterial which atom of Zn attaches to O and which to the radical $SO_4$. It is $ZnSO_4 + ZnO$ in water from any point of view; but while $ZnSO_4$ will remain in solution ZnO is not soluble in water nor in a solution of $ZnSO_4$, and consequently the ZnO is precipitated. The $ZnSO_4$ with which it has been associated then decomposes or reassociates with another molecule of water in the same manner as when first put into solution. It will be seen then that as much ZnO is precipitated upon the anode from the used electrolyte as is taken up from the anode in the displacement of $H_2$ from solution structure in the electrolyte; but while this is the case there appears a gradual deterioration in the value of the current generated, due to other causes. One of them is that the fine precipitation falls upon the anode lightly and loosely and makes a poor connection. This may be remedied at any time by pouring off the electrolyte and rebaking the anode to harden it into a solid mass. Another cause of deterioration in the current is that the cathode (or cathode depolarizer) becomes gradually filled in its intricacies with an insoluble compound of the anode metal or of the metal which is in solution in the electrolyte. The insolubility of this compound is with respect to the electrolyte as a solvent under ordinary conditions. It may be dislodged by cleansing the cathode. This may be done with greater or less efficiency by heating it in the electrolyte, washing it in water, or immersing it in an acid or other solution which will dissolve the undesirable accumulation of anode compound without affecting the cathode metal or such depolarizing compound as may appertain to it. For example, $PbO_2$ (or its equivalent hardened paste made of $Pb_3O_4 + H_2SO_4$) may be cleansed with $H_2SO_4$. $Cu_2Cl_2$ or $CuCl_2$ (as a depolarizer) will not be injuriously affected by HCl, and so on. Such an acid-bath will remove any accumulation of anode-metal compounds not removable in water. In case a porous pot or envelop is employed to contain the cathode or cathode depolarizer an acid (preferably with a negative radical corresponding to the radical or negative ion contained in the electrolyte) may be put into such porous pot at cathode (K, Fig. 1) without dismantling the battery and with excellent results. Having followed these methods to an ultimate conclusion or until such a time as the resulting current is no longer satisfactory, the whole battery may then be regenerated by any modification of the process described in my application, Serial No. 144,348, of February 20, 1903. A modification suggested is that since the electrolyte solution has little or no commercial value it be thrown away and that merely the remaining electrodes be treated, practically by the precess referred to. In experiments extending over a year it has not yet been determined how much time must elapse before it becomes necessary to do this.

Having now described the principle upon which my invention is based, and which basic principle I claim to be new, there remains to call attention to the many chemical combinations by which the same results may be reached. For example, the element may be arranged as

| anode | electrolyte | cathode |
|---|---|---|
| 5Zn | $2HCl + 10H_2O$ | $\frac{PbSO_4}{Cu}$ | the plumbic sulfate being placed in the porous pot in the position of the depolarizer Fig. 4. The following reactions occur:

$$Zn + 2HCl = ZnCl_2 + H_2.$$

$$H_2 + PbSO_4 = Pb + H_2SO_4.$$

$$H_2SO_4 + Zn(anode) = ZnSO_4 + H_2,$$

which $H_2$ escapes. The $PbSO_4$ has thus been reduced to finely-divided Pb, which is equivalent to the arrangement shown in Fig. 3. The element thus becomes

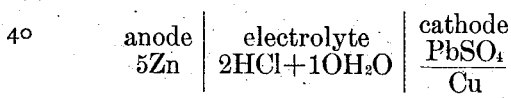

which, in other words, is

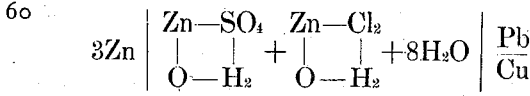

and on closed circuit becomes

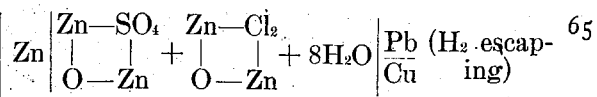

which on precipitation of 2ZnO is manifestly identical with the battery just described. Each anode salt $ZnCl_2$ and $ZnSO_4$ operates independently in the same solution. Either of them will generate a current, and any number of similar salts may be employed in this parallel manner in the same cell.

As one other example of self-transformation let an element be arranged as

| anode | electrolyte | cathode |
|---|---|---|
| 3Zn | $H_2SO_4 + H_2O$ | $\frac{4CuO}{Cu}$ |

Then $$Zn + H_2SO_4 = ZnSO_4 + H_2.$$

$$H_2 + 2CuO = Cu_2O + H_2O.$$

Hence the element becomes

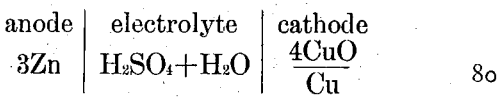

and then on closed circuit

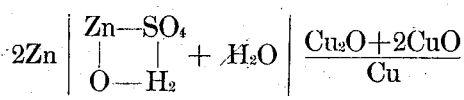

and on precipitation becomes

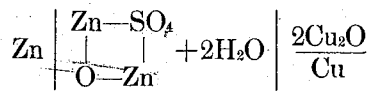

which is again the original proposition. Elements containing an alkaline metal in the electrolyte amount to practically the same thing.

The term "alkaline metal" is meant to embrace all of those metals which decompose water into a hydrate, such as sodium, calcium, ammonium, &c.

Let an element be arranged as

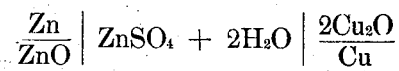

which is the simplest and most direct method of putting it together.

When $K_2SO_4$ is put into solution, there is an endothermic manifestation indication, a rearrangement of atoms between it and water similar to that between water and $ZnSO_4$. The structure may begin in the same manner, thus:

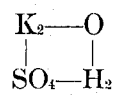

but the upper part ($K_2O$) also reacts with water and may add to the structure thus:

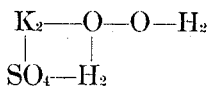

the upper line being equivalent to 2KOH. Then Zn from a zinc anode on closed circuit displaces hydrogen from the structure shown, changing it into

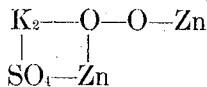

the upper line being equivalent to $K_2ZnO_2$ and the lower to $ZnSO_4$.

In any ordinary battery employing an alkaline hydroxid for an electrolyte such electrolyte when fully used or exhausted consists of an acidic salt, such as $K_2ZnO_2$, the anode metal filling the part of a negative radical. If $K_2ZnO_2$ be added to $ZnSO_4$ in solution, ZnO is precipitated, the reaction being $$K_2ZnO_2 + ZnSO_4 = K_2SO_4 + 2ZnO,$$

and the element thus returns to its original chemical constituency, (minus incidental exceptions noted.) There is, however, an additional consideration in connection with this cell in that $Zn(OH)_2$ is observed to be also precipitated on the anode and to act as additional anode active material. The reactions given represent one set of molecules; but while $K_2ZnO_2$ and $ZnSO_4$ are forming in the electrolyte the electrolyte also contains, of course, a quantity of the original $K_2SO_4$, which in the course of its reactions involves the temporary formation of 2KOH, as shown. Then as an additional ramification the first line of the first grafic form (2KOH) and the last line of the second form ($ZnSO_4$) react together thus:

$$2KOH + ZnSO_4 = K_2SO_4 + Zn(OH)_2,$$

which latter is precipitated to the anode. The precipitated $Zn(OH)_2$ then performs the function of anode active material in precisely the same manner that ZnO would:

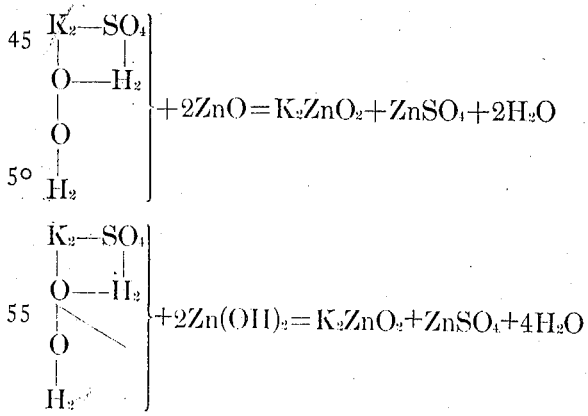

The chemical precipitation of any substance to serve as anode active material other than ZnO is obviously a mere modification of the battery proposed. Another illustration of the same thing is

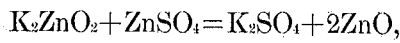

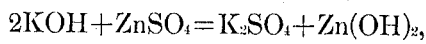

It is understood, of course, that the examples employed are intended to represent a class, and that in reaching the results described the individual chemical components which may be substitued are practically innumerable.

Any combination of chemicals comprising a battery which by reason of their own chemical reaction finally become transformed into practically the same thing as the battery described is manifestly equivalent thereto.

It should be borne in mind that the battery herein proposed generates an electrical current and that in order for it to do so there must necessarily be chemical reaction. The reactions described occur only on closed circuit, and the galvanic circuit is apparently the cause of their occurring. When the circuit is open, the elements fall back to their normal state, minus such deteriorating changes as have been already mentioned.

It is observed in this battery that after it has been continuously at work for a time (varying from some days to some weeks, according to its structure) and the value of the current has decreased a very decided recovery in the value of the current is had by allowing the battery to stand on open circuit. This is probably due to the fact that the closed circuit induces the reaction which takes up the active material of the anode. It is evident that the longer the battery is at work the more anode material will be in suspension, solution, or combination with the electrolyte and the less capable will the electrolyte be of taking up more, whereas when the circuit is open no more anode material is taken up and that which is already suspended in the electrolyte is precipitated. It is obvious that the effect of thus clearing the electrolyte is essentially regeneratory in character. It is also observed that after the battery has been some time at work, with a gradual decrease in the value of the current as above, a marked improvement is had by heating the whole battery. The effect is probably due in chief measure to three points: first, that a raised temperature improves the capabilities of water as a solvent of solids, stimulating and sharpening the solution structure of the electrolyte; next, that the heating tends to settle or rearrange the position of the active material which has previously been precipitated from the electrolyte and puts it into firmer contact with the anode; finally, that the heating of the electrolyte dissolves or dislodges a part of any accumulated anode compounds which may have found a lodgment in the intricacies of the cathode. As may be inferred, the degree of regeneratory influence obtained from this treatment varies largely with the combination of chemicals subjected to it.

I do not, of course, confine myself to the precise construction shown in the drawings. Any mechanical arrangement of parts may be employed which does not interfere with essential principles.

I claim—

1. An electrical battery having an anode composed of an electrical conductor upon or around which is placed or deposited a quantity of a compound of an anode metal; such conductor serving as negative pole and being placed in such position that any solids chemically precipitated from the electrolyte may fall in proximity thereto; such solids thereby forming anode active material: having an electrolyte composed of one or more salts of one or more anode metals in solution; and having a cathode composed of any conducting substance chemically unattacked by the electrolyte; substantially as described.

2. An electrical battery having an anode composed of an electrical conductor upon or around which is placed or deposited a quantity of a compound of an anode metal; such conductor serving as negative pole and being placed in such position that any solids chemically precipitated from the electrolyte may fall in proximity thereto; such solids thereby forming anode active material: having an electrolyte composed of one or more salts of one or more anode metals in solution: having any suitable compound in the position of depolarizer; and having a cathode composed of any conducting substance chemically unattacked by the electrolyte; substantially as described.

3. An electrical battery having an anode composed of an electrical conductor upon or around which is placed or deposited a quantity of a compound of an anode metal; such conductor serving as negative pole and being placed in such position that any solids chemically precipitated from the electrolyte may fall in proximity thereto; such solids thereby forming anode active material; having an electrolyte composed of one or more salts of one or more alkaline metals in solution; and having a cathode composed of any conducting substance chemically unattacked by the electrolyte; substantially as described.

4. An electrical battery having an anode composed of an electrical conductor upon or around which is placed or deposited a quantity of a compound of an anode metal; such conductor serving as negative pole and being placed in such position that any solids chemically precipitated from the electrolyte may fall in proximity thereto; such solids thereby forming anode active material: having an electrolyte composed of one or more salts of one or more alkaline metals in solution: having any suitable compound in the position of depolarizer; and having a cathode composed of any conducting substance chemically unattacked by the electrolyte; substantially as described.

5. An electrical battery having an anode composed of an electrical conductor upon or around which is placed or deposited a quantity of a compound of an anode metal; such conductor serving as negative pole and being placed in such position that any solids chemically precipitated from the electrolyte may fall in proximity thereto; such solids thereby forming anode active material: having an electrolyte composed of one or more salts of one or more anode metals together with one or more salts of one or more alkaline metals in solution; and having a cathode composed of any conducting substance chemically unattacked by the electrolyte; substantially as described.

6. An electrical battery having an anode composed of an electrical conductor upon or around which is placed or deposited a quantity of a compound of an anode metal; such conductor serving as negative pole and being placed in such position that any solids chemically precipitated from the electrolyte may fall in proximity thereto; such solids thereby forming anode active material: having an electrolyte composed of one or more salts of one or more anode metals together with one or more salts of one or more alkaline metals in solution; having any suitable compound in the position of depolarizer; and having a cathode composed of any conducting substance chemically unattacked by the electrolyte; substantially as described.

7. An electrical battery consisting of an anode, electrolyte and cathode in a containing vessel; the anode thereof being placed in such position in the electrolyte that any solids chemically precipitated from such electrolyte may fall upon or in electrical proximity to such anode; such precipitated solids thereby forming additional anode active material; substantially as described.

8. An electrical battery consisting of an anode, electrolyte, depolarizer and cathode in a containing vessel; the anode thereof being placed in such position in the electrolyte that any solids chemically precipitated from such electrolyte may fall upon or in electrical proximity to such anode; such precipitated solids thereby forming additional anode active material; substantially as described.

9. In an electrical battery the combination of an electrolyte of metallic salts in solution, a suitable compound in the position of depolarizer, and an anode formed by fixing into electrical contact with a conductor serving as negative pole, the compound or compounds precipitated from the electrolyte during previous use of the battery; substantially as described.

10 In an electrical battery the combination of an electrolyte, with an anode formed by fixing into electrical contact with a conductor serving as negative pole, the compound or compounds precipitated from the electrolyte during previous use of the battery, for the purpose of again precipitating a solid to be thereafter utilized as anode active material; substantially as described.

11. In an electrical battery, an anode formed by fixing into electrical contact with a conductor serving as negative pole, the compound or compounds of anode metal, formed and precipitated from the electrolyte during previous use of the battery; substantially as described.

In testimony whereof I have signed my name in the presence of two subscribing witnesses.

J. ROGER LORD.

Witnesses:
   JOHN BOSS,
   M. J. REEVES.